(12) United States Patent
Lo

(10) Patent No.: US 9,130,746 B1
(45) Date of Patent: Sep. 8, 2015

(54) SINGLE PAIR PHY WITH AUTO-NEGOTIATION

(75) Inventor: William Lo, Cupertino, CA (US)

(73) Assignee: MARVELL INTERNATIONAL LTD. (BM)

(*) Notice: Subject to any disclaimer, the term of this patent is extended or adjusted under 35 U.S.C. 154(b) by 250 days.

(21) Appl. No.: 13/350,969

(22) Filed: Jan. 16, 2012

Related U.S. Application Data

(60) Provisional application No. 61/436,806, filed on Jan. 27, 2011.

(51) Int. Cl.
  *H04L 5/16* (2006.01)
  *H04L 5/14* (2006.01)
(52) U.S. Cl.
  CPC ........................................ *H04L 5/14* (2013.01)
(58) Field of Classification Search
  CPC .......... H04L 5/14; H04B 3/20; H04B 7/2606; H04B 7/2643; G05B 2219/33188; H04N 7/108
  USPC ........................................................ 370/296
  See application file for complete search history.

(56) References Cited

U.S. PATENT DOCUMENTS

| 4,594,707 | A | * | 6/1986 | Merritt et al. ................. 370/465 |
| 5,799,041 | A | * | 8/1998 | Szkopek et al. ............... 375/259 |
| 6,876,696 | B1 | | 4/2005 | Goodson et al. |
| 6,975,637 | B1 | | 12/2005 | Lenell |
| 7,061,937 | B1 | * | 6/2006 | Wada ............................. 370/487 |
| 7,173,191 | B2 | * | 2/2007 | Prescott ..................... 174/113 C |
| 7,751,350 | B1 | * | 7/2010 | Pabst ............................ 370/285 |
| 7,778,313 | B2 | | 8/2010 | Agazzi |
| 2001/0038674 | A1 | | 11/2001 | Trans |
| 2006/0077995 | A1 | * | 4/2006 | Lenell .......................... 370/412 |
| 2006/0290356 | A1 | * | 12/2006 | Pharn et al. .................. 324/533 |
| 2010/0171521 | A1 | * | 7/2010 | Binder ........................... 326/30 |
| 2011/0243206 | A1 | * | 10/2011 | Shalita et al. ................. 375/224 |
| 2012/0026922 | A1 | * | 2/2012 | Diab et al. .................... 370/296 |

* cited by examiner

*Primary Examiner* — Melvin Marcelo
*Assistant Examiner* — Ellen A Kirillova

(57) ABSTRACT

Systems, methods, and other embodiments associated with auto-negotiating over a single pair PHY are described. According to one embodiment, an apparatus includes a physical layer (PHY) transceiver configured to communicate over a single twisted pair channel. The apparatus includes a setup logic configured to control the PHY transceiver to initiate an auto-negotiation sequence over the single twisted pair channel with a remote device upon detecting a transmission from the remote device on the single twisted pair channel. The auto-negotiation sequence includes an exchange of parameters with the remote device using a half-duplex mode to communicate on the single twisted pair channel.

17 Claims, 4 Drawing Sheets

SINGLE PAIR PHY WITH AUTO-NEGOTIATION

CROSS REFERENCE TO RELATED APPLICATIONS

This disclosure claims the benefit of U.S. provisional application Ser. No. 61/436,806 filed on Jan. 27, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Home networks and enterprise networks typically use twisted pair cables to connect devices together. A single twisted pair cable typically includes four pairs of twisted copper wires (i.e., 8 total copper wires in one cable). As technologies advance, protocols used with four twisted pair cables have increased bandwidth by orders of magnitude (e.g., 10 Megabytes/second, 100 Megabytes/second, 1000 Megabytes/second). However, transceivers that operate over standard four twisted pair cables lack the ability to adapt to certain events associated with the loss of available channels and so on.

Thus even though existing protocols seek to improve throughput over existing infrastructure, certain aspects of the existing protocols impact adaptability of transceivers. For example, existing auto-negotiation protocols use multiple twisted pair channels to establish connections.

SUMMARY

In one embodiment, an apparatus includes a physical layer (PHY) transceiver configured to communicate over a single twisted pair channel. Setup logic is configured to control the PHY transceiver to initiate an auto-negotiation sequence over the single twisted pair channel with a remote device upon detecting a transmission from the remote device on the single twisted pair channel. The auto-negotiation sequence includes an exchange of parameters with the remote device using a half-duplex mode to communicate on the single twisted pair channel.

In another embodiment, a method includes initiating an auto-negotiation sequence from a first device with a second device over a twisted pair channel. The auto-negotiation sequence is initiated upon detecting a transmission from the second device on the twisted pair channel. The auto-negotiation sequence is an exchange of parameters with the second device using a half-duplex mode to communicate on the twisted pair channel. The method also includes changing from the half-duplex mode to a dual-duplex mode to establish, by the first device, a connection over the twisted pair channel based, at least in part, on the parameters from the auto-negotiation sequence.

In one embodiment, an integrated circuit includes a transceiver configured to communicate over a twisted pair channel. The integrated circuit includes a controller configured to control the transceiver to initiate an auto-negotiation sequence over the twisted pair channel with a remote device upon detecting a transmission from the remote device on the twisted pair channel. The auto-negotiation sequence is an exchange of parameters with the remote device using a half-duplex mode to communicate on the twisted pair channel. The integrated circuit includes a duplex logic configured to control the transceiver to switch from the half-duplex mode to a dual-duplex mode to establish a connection over the twisted pair channel based, at least in part, on the parameters from the auto-negotiation sequence.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are example methods, apparatus, and other embodiments associated with improving the establishment of a connection by using auto-negotiation over a single twisted pair channel. In one embodiment, a physical layer (PHY) transceiver initiates and performs an auto-negotiation sequence using only a single twisted pair channel. By performing the auto-negotiation sequence over the single twisted pair channel, the PHY transceiver can establish a high bandwidth connection with a device without using multiple twisted pair channels. In one example, using only one single twisted pair channel can improve the efficiency of the auto-negotiation sequence by freeing other twisted pair channels for additional uses. In other embodiments, a cable connecting the PHY transceiver with a remote device has only a single twisted pair channel. Thus, the PHY transceiver configured in this way provides for greater adaptability to differing network configurations and conditions.

Figure 1:
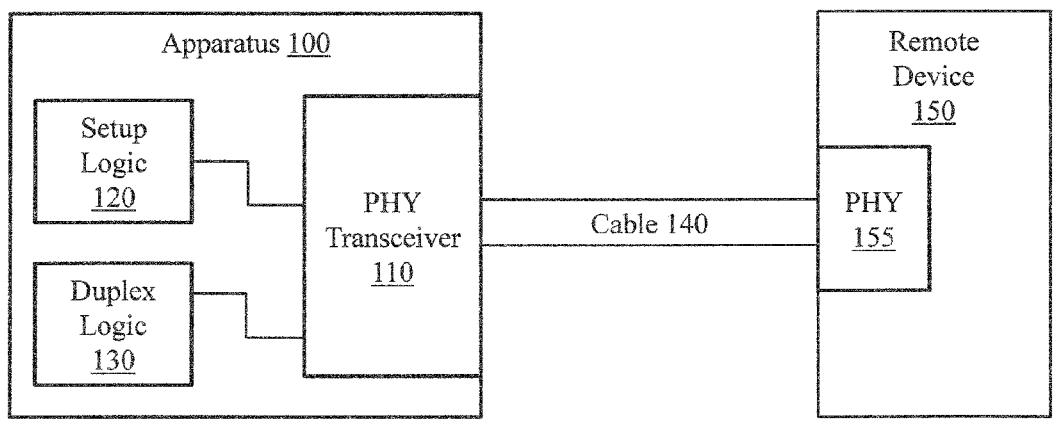
FIG. 1 illustrates one embodiment of an apparatus associated with auto-negotiation over a single twisted pair channel.

With reference to FIG. 1, one embodiment of an apparatus 100 is shown that is associated with auto-negotiation over a single twisted pair channel. The apparatus 100 includes a physical layer (PHY) transceiver 110, setup logic 120, and duplex logic 130. In one embodiment, the setup logic 120 is configured to control the PHY transceiver 110 to establish a connection over the single twisted pair channel. The duplex logic 130 is configured to change a duplex mode of the PHY transceiver 110 for communicating on the twisted pair channel. The PHY transceiver 110 can be connected to a cable 140 (e.g., via a port) for communicating with a remote device 150, which also includes a PHY transceiver 155.

In one embodiment, the duplex logic 130 switches the duplex mode of the PHY transceiver 110 between a half-duplex mode, a full-duplex mode, and a dual-duplex mode. When operating in the half-duplex mode to communicate between the apparatus 100 and the remote device 150, only one PHY transceiver on the twisted pair channel can transmit at a time. Operation in the full-duplex mode permits both PHY transceivers to transmit at the same time; however, two separate twisted pair channels are used to accommodate the transmissions. While operating in the dual-duplex mode, both PHY transceivers can transmit simultaneously on a single channel. However, before the PHY transceivers can communicate using the dual-duplex mode, a master/slave relationship for a clock signal needs to be established. Thus, in one embodiment, the PHY transceiver 110 communicates an auto-negotiation sequence with the device 150 using the half-duplex mode to exchange parameters. Once the parameters are exchanged the master/slave relationship is established and the PHY transceiver 110 may be switched to the dual-duplex mode to communicate over the single twisted pair channel (in cable 140) using higher data rates.

In one example, apparatus 100 performs auto-negotiation over a single twisted pair channel when multiple channels are not available or for a more efficient negotiation process. While an auto-negotiation sequence may be performed using two twisted pair channels, using a single twisted pair channel to auto-negotiate parameters between the apparatus 100 and the device 150 may improve efficiency by using fewer resources (i.e., a single channel vs. multiple channels). In one embodiment, the cable 140 includes only a single twisted pair of wires. Thus, the PHY transceiver 110 does not have the option of using multiple channels since the cable 140 includes only the single twisted pair channel (e.g., one pair of twisted wires). Accordingly, the PHY transceiver 110 can still establish a connection that uses the dual-duplex mode since the PHY transceiver 110 is configured to perform the auto-negotiation sequence using only the single twisted pair channel.

In various embodiments, the PHY transceiver 110 may be configured with a port that accepts a cable (e.g., cable 140) with a connector. The cable 140 and connector may, for example, include multiple twisted pair channels or a single twisted pair channel. The single twisted pair channel is also referred to herein as a twisted pair channel, a communication channel, or simply a channel. The single twisted pair channel is, for example, a communication channel between the PHY transceiver 110 and the PHY transceiver 155 in the device 150. The PHY transceiver 110 is, in one embodiment, a transceiver that is compatible with the physical layer (i.e., the first layer) of the Open Systems Interconnection (OSI) model for data communications. The PHY transceiver 110 may be embodied, for example, in a network interface card (NIC) or other communication interface.

In one embodiment, the cable 140 is a networking cable that carries communications between two endpoint devices (e.g., apparatus 100 and remote device 150). The single twisted pair channel is, for example, two physical wires enclosed in the cable 140. In one embodiment, the cable 140 can include four twisted pair channels. The four twisted pair channels can be embodied as four pairs of twisted wire. If the cable 140 includes four twisted pairs, the single twisted pair channel is implemented using only one of the four pairs of twisted wire. In another embodiment, the cable 140 includes one pair of twisted wires and thus one twisted pair channel.

Figure 2:
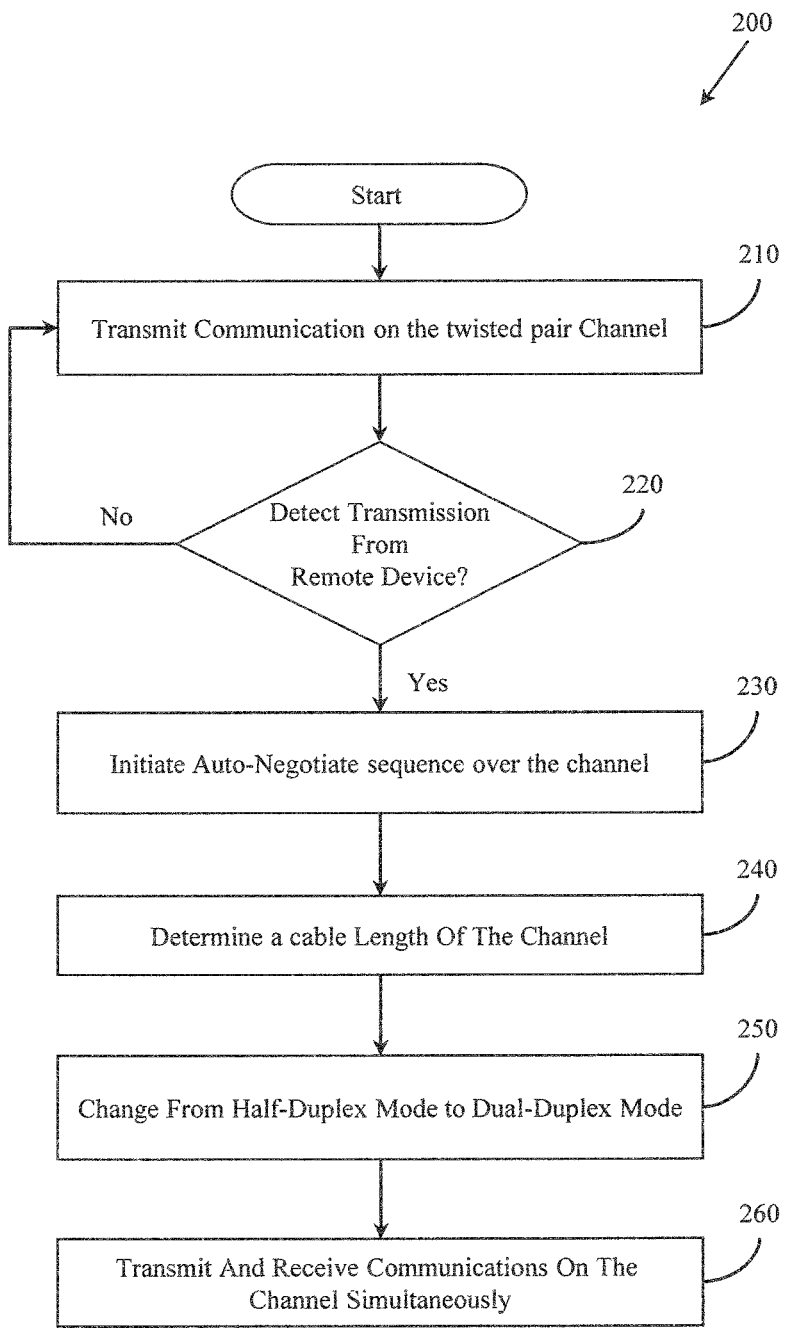
FIG. 2 illustrates one embodiment of a method associated with an auto-negotiating over a single twisted pair channel.

Further details of communications over the single twisted pair channel will be discussed in greater detail in conjunction with FIG. 2. FIG. 2 illustrates one embodiment of a method 200 associated with an auto-negotiation sequence between two devices over a single twisted pair channel. FIG. 2 is discussed from the perspective that the method 200 is implemented and performed by the apparatus 100 of FIG. 1 to establish a connection with the device 150 over the cable 140.

In the following discussion, the cable 140 has only a single twisted pair channel (e.g., a single twisted pair of wires).

At 210, the PHY transceiver 110 transmits a communication on one twisted pair channel to the device 150. In one embodiment, the communication is transmitted by the PHY transceiver 110 at the request of the setup logic 120. The communication, in one example, is a beacon that is transmitted upon the occurrence of an event in apparatus 100. In one embodiment, the event is a power on event, a plug-in event of the cable 140 into a port of the PHY transceiver 110, a request for communications by a process associated with the apparatus 100, and so on. The beacon may be, for example, a first communication in the auto-negotiation sequence, a heartbeat signal, and so on.

At 220, the setup logic 120 listens for a transmission on the twisted pair channel from the remote device 150 using the PHY transceiver 110. In one embodiment, the setup logic 120 is configured to listen for a predefined time interval for the transmission. In one embodiment, the predefined time interval includes a first time interval and a second time interval. The first time interval is a time period to wait in order to avoid a reflection of the signal on the twisted pair channel that may interfere with other transmissions. A signal reflection is an artifact of the transmission, which is a portion of the signal that is reflected back to the PHY transceiver 110 from an endpoint on the cable 140. Thus, in one example, waiting the first time interval may avoid a false detection on the channel.

After the first time interval elapses and during the second time interval the setup logic 120 listens for a transmission from the device 150. In one embodiment, the second time interval is a predetermined amount of time during which a transmission from the device 150 is most probable. The second time interval is, for example, a time frame sufficient to account for a fixed time interval used as a wait time in the auto-negotiation sequence, a propagation delay of the cable 140, and so on. In this way, the apparatus 100 may avoid collisions between transmissions on the single twisted pair channel when using the half-duplex mode. The predefined time interval may account for expected time frames of communications from the device 150 and apparatus 100 on the channel.

If the setup logic 120 does not detect a transmission from the remote device 150 on the cable 140, then the method 200 proceeds back to 210 where the PHY transceiver 110 transmits another communication on the twisted pair channel. In one embodiment, this results in the PHY transceiver 110 iteratively transmitting on the twisted pair channel until detecting a transmission from the device 150.

At 220, if the setup logic 120 detects a transmission while listening then the method 200 proceeds to 230. In one embodiment, the detected transmission from the device 150 is similar to the communication from the PHY transceiver 110 transmitted at 210. Thus, the device 150 may also operate according to method 200.

At 230, the setup logic 120 initiates an auto-negotiation sequence from the PHY transceiver 110 with the remote device 150 over the twisted pair channel. In one embodiment, once the setup logic 120 detects the transmission from the device 150, the setup logic 120 waits a fixed time interval and then begins the auto-negotiation sequence. In one embodiment, the fixed time interval (e.g., time interval 365 from FIG. 3a) is a predetermined wait time for transmitting on the single twisted pair channel to avoid transmission collisions. Transmission collisions may occur because the PHY transceiver 110 is using a half-duplex mode. Thus, when both devices on the channel transmit simultaneously a collision occurs and as a result neither device will be able to receive a communication. By using the fixed time interval between transmissions, communications from the auto-negotiation sequence can be traded back and forth while using half-duplex mode and avoiding collisions.

In one embodiment, the auto-negotiation sequence includes a set of communications, for example, transmissions to the remote device 150 and communications received from the remote device 150. The auto-negotiation sequence includes parameters that identify properties of the apparatus 100 and the remote device 150. The properties may include, for example, compatible protocols, capabilities of the apparatus 100 and/or capabilities the remote device 150 such as communication speeds and modes, and so on. The set of communications may also provide for determining which device provides a master clock signal to coordinate communications in a dual-duplex mode.

At 240, during the auto-negotiation sequence, the setup logic 120 may determine a length of the cable 140. In one embodiment, the length of the cable 140 is, for example, used as a factor when negotiating the connection. To determine the length of the cable, the setup logic 120 determines the propagation delay ($T_p$) of a signal/message travelling through the cable 140. The length of the cable 140 is, for example, proportional to the propagation delay ($T_p$). The setup logic 120 may determine the propagation delay ($T_p$) from the following equation:

$$T_p = T_R - T_0 - T_{fix}/2$$

$T_0$ is transmission time of a first communication from the apparatus 100.

$T_R$ is the time of reception of a subsequent communication from the device 150.

$T_{fix}$ is the fixed time interval between transmissions on the twisted pair channel. In one example, $T_{fix}$ is known by the setup logic 120 before communications begin.

Accordingly, once at least one set of communications is exchanged during the auto-negotiation sequence (e.g., see signals 325 and 330 shown in FIG. 3b), the setup logic 120 may determine the length of the cable 140 by tracking $T_0$ and $T_R$. In one embodiment, the cable length can then be used as a parameter that is exchanged in the auto-negotiation sequence or, for example, it may affect other parameters of the connection that are negotiated.

With continued reference to FIG. 2, after completing the auto-negotiation sequence, the method 200 proceeds to 250. At 250, the duplex logic 130 changes the communication mode of the PHY transceiver 110 from the half-duplex mode to a dual-duplex mode. Changing to the dual-duplex mode establishes a connection over the single twisted pair channel with the device 150. The connection is based on the parameters exchanged during the auto-negotiation sequence. For example, a clock signal and a speed of the connection may be determined during the auto-negotiation sequence.

At 260, the PHY transceiver 110 transmits and receives communications on the single twisted pair channel simultaneously in the dual-duplex mode. The apparatus 100 and the device 150 are then able to communicate using the single channel in the dual-duplex mode. In one embodiment, if the cable 140 includes multiple channels (e.g., multiple twisted pair wires), the parameters exchanged during the auto-negotiation sequence over the single channel may be used to provide communications over additional available channels.

Figure 3A:
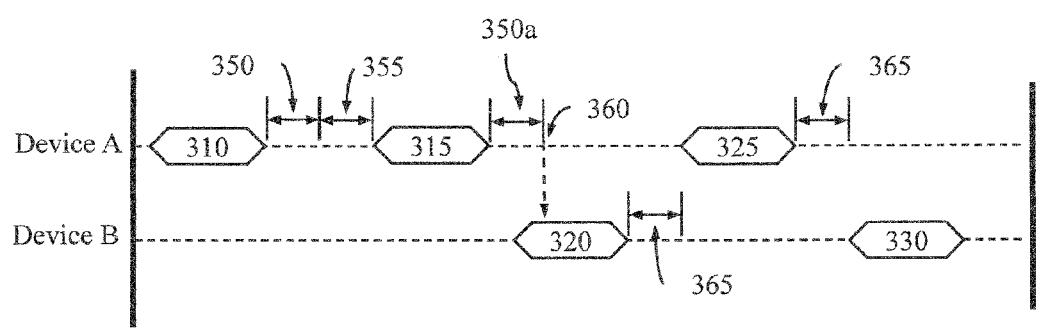
FIG. 3a illustrates an example timing diagram of communications over the single twisted pair channel between two devices.
Figure 3B:
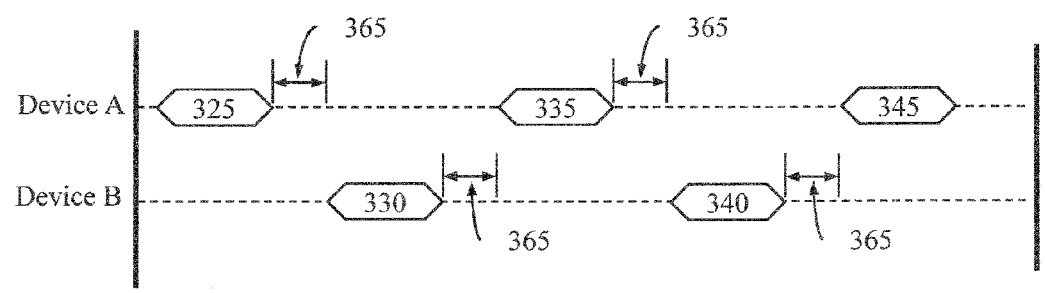
FIG. 3b illustrates an example timing diagram of communications in an auto-negotiation sequence.

FIG. 3a illustrates an example timing diagram of communications over a single twisted pair channel between a device A (e.g., apparatus 100) and a device B (e.g., device 150). The communications illustrated in FIG. 3a are one example of how an auto-negotiation sequence may be initiated. FIG. 3b illustrates one example of communications that may occur during an auto-negotiation sequence. FIGS. 3a and 3b will be discussed using references to method 200 from FIG. 2.

As illustrated in FIG. 3a, communications 310 and 315 are examples of beacon transmissions such as those from 210 of method 200. For example, once device A provides communication 310 on the twisted pair channel, device A waits a first time interval 350. In one embodiment, device A waits the first time interval 350 before listening on the channel to avoid detecting a reflection that may interfere with detecting a true signal from device B. After the first time interval 350 elapses, device A listens on the twisted pair channel during a second time interval 355 in order to detect a communication from device B (e.g., 220 of method 200). If device A detects no transmission on the twisted pair channel during the second time interval 355 then device A transmits a communication 315 (e.g., 210 of method 200). In one example, the communication 315 is identical to the communication 310.

After device A transmits the communication 315, device A once again waits the first interval shown as 350a. After time interval 350a elapses, device A listens on the single twisted pair channel for a transmission from device B. In FIG. 3a, device A detects a transmission 320 from device B at 360.

As depicted in FIG. 3a device B is, for example, transmitting communication 320 on the twisted pair channel in response to communication 315 from device A. Device B may also be transmitting communication 320 based on a different event such as a power on event, and so on. In either case, when device A detects communication 320, as in 220 of method 200, the auto-negotiation sequence with device B is initiated by transmitting communication 325. Accordingly, after detecting communication 320 device A does not continue listening for the second time interval 355. Instead, device A receives the communication 320 and determines when the communication 320 is complete. After identifying that the communication 320 is complete, device A waits a fixed time interval 365 before transmitting the first communication 325 of the auto-negotiation sequence (e.g., 230 of method 200).

FIG. 3b illustrates one example of an auto-negotiation sequence as initiated in FIG. 3a between device A and device B. The auto-negotiation sequence begins with the communication 325 from device A. Device A transmits communication 325 on the single twisted pair channel after the fixed time interval 365 elapses. In this way, device A and device B can take turns transmitting communications in the auto-negotiation sequence using a half-duplex mode over the single twisted pair channel. Since transmissions occurring at the same time on the single twisted pair channel in half-duplex mode will result in a collision, using the fixed time interval 365 to separate communications between device A and device B provides for two-way communications on the single twisted pair channel without collisions occurring.

In one embodiment, using the fixed time interval 365 to space communications also provides for determining a propagation delay associated with the cable as at 240 of method 200. In one embodiment, according to known characteristics of the cable (e.g. cable 140) in which the single twisted pair channel is embodied, an estimate for the length of the cable may be determined from the propagation delay. The length of the cable may then be used in the auto-negotiation sequence to negotiate parameters of a connection between device A and device B. For example, the cable length may affect a negotiated speed of the connection, error correction algorithm used with the connection, and so on.

Once the auto-negotiation sequence completes with communications 330, 335, 340, and 345, device A and device B may, for example, switch to a dual-duplex mode (e.g., 250 of method 200) and transmit communications on the single twisted pair channel simultaneously (e.g., 260 of method 200). In one embodiment, the dual-duplex mode is a communication mode that is compatible with 1000 baseT communications. Additionally, the communications in the dual-duplex mode and the half-duplex mode between the device A and the device B may use, for example, differential Manchester encoding, Pulse-amplitude Modulation (PAM) coding, and so on.

Figure 4:
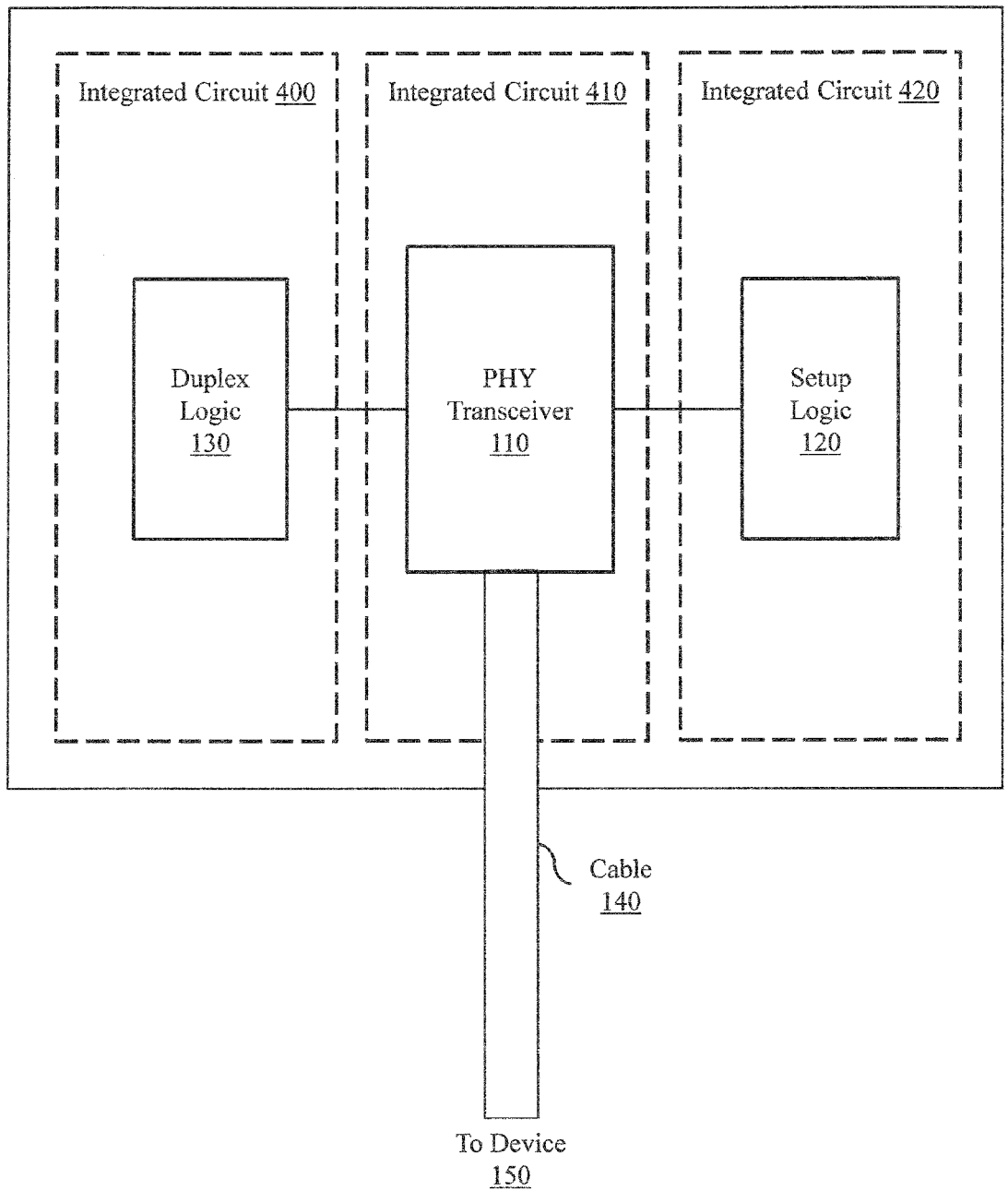
FIG. 4 illustrates one embodiment of an integrated circuit that performs auto-negotiation over a single pair PHY.

FIG. 4 illustrates an additional embodiment of the apparatus 100 from FIG. 1 that is configured with separate integrated circuits and/or chips. In this embodiment, the PHY transceiver 110 from FIG. 1 is embodied as a separate integrated circuit 410. Additionally, the setup logic 120 is embodied on an individual integrated circuit 420. Duplex logic 130 is also embodied on an individual integrated circuit 400. The circuits are connected via connection paths to communicate signals. While integrated circuits 400, 410, and 420 are illustrated as separate integrated circuits, they may be integrated into a common circuit board. Additionally, integrated circuits 400, 410, and 420 may be combined into fewer integrated circuits or divided into more integrated circuits than illustrated. Additionally, in another embodiment, the logics 120 and 130 illustrated in integrated circuits 400 and 420 may be combined into a separate application specific integrated circuit. In other embodiments, the functionality associated with the logics 120 and 130 may be embodied as firmware executable by a processor. Additionally, in one embodiment, integrated circuit 410 may include a port for connecting a cable (e.g., cable 140) that includes a connector for a single channel twisted pair channel. In another embodiment, integrated circuit 410 may include a port for connecting a cable with a connector that includes four twisted pair channels.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory computer-readable medium, and/or combinations of each to perform a function(s) or an action(s), and/or to cause a function or action from another logic, method, and/or system. Logic may include a microprocessor programmed to performed one or more of the disclosed functions, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:

a physical layer (PHY) transceiver configured to communicate over a single twisted pair channel; and a setup logic configured to control the PHY transceiver to initiate an auto-negotiation sequence over the single twisted pair channel with a remote device upon detecting a transmission from the remote device on the single twisted pair channel, wherein the auto-negotiation sequence includes an exchange of parameters with the remote device using a half-duplex mode to communicate on the single twisted pair channel, wherein the PHY transceiver is configured to communicate with the remote device in the half-duplex mode by asynchronously sending and receiving communications for the auto-negotiation sequence over the single twisted pair channel, and wherein the PHY transceiver communicates asynchronously by sending and receiving communications of the auto-negotiation sequence at different times on the single twisted pair channel; and a duplex logic configured to control the PHY transceiver to switch from the half-duplex mode to a dual-duplex mode to establish a connection with the remote device over the single twisted pair channel based, at least in part, on the parameters from the auto-negotiation sequence, wherein the PHY transceiver is configured to simultaneously transmit and receive communications on the single twisted pair channel when switched to the dual-duplex mode, wherein the auto-negotiation sequence consists of communications provided asynchronously back-and-forth over the same single twisted pair channel, wherein the setup logic is configured to use the auto-negotiation sequence to initially establish communications with the remote device upon being initialized, and wherein the single twisted pair channel is established in a cable including only one twisted pair of wires.

2. The apparatus of claim 1, wherein the PHY transceiver is configured to use the single twisted pair channel in a dual duplex mode according to parameters that are compatible with a 1000 baseT protocol upon completing the auto-negotiation sequence, wherein the setup logic is configured to determine a length of the cable based, at least in part, on a time to receive a message from the remote device in the auto-negotiation sequence, and wherein one or more of the parameters are based, at least in part, on the length of the cable.

3. The apparatus of claim 1, wherein the setup logic is configured to control the PHY transceiver to iteratively transmit a communication on the single twisted pair channel at a predefined time interval until detecting the transmission from the remote device, wherein the predefined time interval includes a wait interval for listening for the transmission from the remote device.

4. The apparatus of claim 1, wherein the setup logic is configured to control auto-negotiation sequence between the PHY transceiver and the remote device to be communicated over the single twisted pair channel with the PHY transceiver operating in the half-duplex mode, wherein signals transmitted in the half-duplex mode are encoded with differential Manchester encoding.

5. The apparatus of claim 1, wherein the setup logic is configured to control the PHY transceiver to transmit and receive a set of communications spaced at fixed time intervals with the remote device over the single twisted pair channel during the auto-negotiation sequence, and wherein the single twisted pair channel is one of a plurality of channels in a cable.

6. The apparatus of claim 1, wherein the PHY transceiver is configured to communicate with the remote device in the half-duplex mode and a dual-duplex mode using a channel consisting of the single twisted pair channel.

7. A method, comprising:
  initiating an auto-negotiation sequence from a first device with a second device over a twisted pair channel upon detecting a transmission from the second device on the twisted pair channel, wherein the auto-negotiation sequence is an exchange of parameters with the second device using a half-duplex mode to communicate on the twisted pair channel, wherein initiating the auto-negotiation sequence includes asynchronously communicating on the single twisted pair channel that is established in a cable including only one twisted pair of wires,
  wherein initiating the auto-negotiation sequence includes the first device communicating with the second device in the half-duplex mode by asynchronously sending and receiving communications of the auto-negotiation sequence over the single twisted pair channel,
  wherein communicating with the second device for the auto-negotiation sequence includes asynchronously sending and receiving communications of the auto-negotiation sequence at different times, by the first device, on the twisted pair channel, wherein the auto-negotiation sequence initially establishes communications with the second device upon the first device being initialized, and wherein the auto-negotiation sequence consists of communications provided asynchronously over the twisted pair channel between the first device and the second device;
  changing from the half-duplex mode to a dual-duplex mode to establish, by the first device, a connection over the twisted pair channel based, at least in part, on the parameters from the auto-negotiation sequence; and
  transmitting and receiving communications on the twisted pair channel simultaneously by the first device when using the dual-duplex mode, wherein transmitting and receiving the communications in the half-duplex mode and the dual-duplex mode includes using a channel consisting of the single twisted pair channel.

8. The method of claim 7, further comprising:
  determining a length of a cable used to establish the twisted pair channel, wherein the length is determined based, at least in part, on a reception time of a message from the second device during the auto-negotiation sequence, wherein one or more of the parameters are based, at least in part, on the length, and wherein determining the length of the cable includes determining the length for the cable that includes only one twisted pair of wires.

9. The method of claim 7, further comprising:
  iteratively transmitting a communication from the first device on the twisted pair channel at a predefined time interval until detecting the transmission from the second device, wherein the predefined time interval includes a first time interval to wait in order to avoid a reflection on the twisted pair channel and a second time interval for listening for the transmission from the second device.

10. The method of claim 7, wherein the auto-negotiation sequence between the first device and the second device is communicated using the twisted pair channel.

11. The method of claim 7, wherein the auto-negotiation sequence includes transmitting and receiving a set of communications spaced at fixed time intervals with the second device over the twisted pair channel.

12. An integrated circuit, comprising:
  a transceiver configured to communicate over a twisted pair channel;
  a controller configured to control the transceiver to initiate an auto-negotiation sequence over the twisted pair channel with a remote device upon detecting a transmission from the remote device on the twisted pair channel, wherein the auto-negotiation sequence is an exchange of parameters with the remote device using a half-duplex mode to communicate on the twisted pair channel, and
  wherein the transceiver is configured to communicate with the remote device in the half-duplex mode by asynchronously sending and receiving communications for the auto-negotiation sequence using the twisted pair channel, wherein the transceiver is configured to communicate asynchronously by sending and receiving communications of the auto-negotiation sequence at different times on the twisted pair channel,
  wherein the auto-negotiation sequence consists of communications provided asynchronously back-and-forth over the same single twisted pair channel, wherein the controller is configured to use the auto-negotiation sequence to initially establish communications with the remote device upon being initialized, and
  wherein the single twisted pair channel is established in a cable including only one twisted pair of wires; and
  a duplex logic configured to control the transceiver to switch from the half-duplex mode to a dual-duplex mode to establish a connection over the twisted pair channel based, at least in part, on the parameters from the auto-negotiation sequence, wherein the transceiver is configured to simultaneously transmit and receive communications on the single twisted pair channel when switched to the dual-duplex mode.

13. The integrated circuit of claim 12, wherein the transceiver is configured to communicate with the remote device in the half-duplex mode and the full duplex mode using a channel consisting of the twisted pair channel.

14. The integrated circuit of claim 12, and wherein the setup logic is configured to determine a length of the cable based, at least in part, on a reception time of a message from the remote device in the auto-negotiation sequence, wherein one or more of the parameters are based, at least in part, on the length.

15. The integrated circuit of claim 12, wherein the setup logic is configured to control the transceiver to iteratively transmit a communication on the twisted pair channel at a predefined time interval until detecting the transmission from the remote device, wherein the predefined time interval includes a wait interval for listening for the transmission from the remote device.

16. The integrated circuit of claim 12, wherein the setup logic is configured to control the auto-negotiation sequence between the transceiver and the remote device to be communicated over the twisted pair channel with the transceiver operating in the half-duplex mode.

17. The integrated circuit of claim 12, wherein the setup logic is configured to control the transceiver to transmit and receive a set of communications spaced at fixed time intervals with the remote device over the twisted pair channel during the auto-negotiation sequence.

* * * * *